United States Patent [19]

Cumming

[11] 3,936,096

[45] Feb. 3, 1976

[54] AXLE ASSEMBLY

[75] Inventor: James C. Cumming, Oakland County, Mich.

[73] Assignee: Rockwell International Corporation, Pittsburgh, Pa.

[22] Filed: Feb. 15, 1975

[21] Appl. No.: 550,096

Related U.S. Application Data

[63] Continuation of Ser. No. 214,784, Jan. 3, 1972, abandoned.

[52] U.S. Cl............. 303/21 EB; 303/21 F; 303/85; 180/1 H
[51] Int. Cl.²...................... B60T 8/08; B60T 11/26
[58] Field of Search............. 303/7, 21 F, 21 EB, 1, 303/85; 180/1 H; 64/3, 4, 1 R, 1 V, 1 C, 32 R, 32 F; 181/36 R, 36 D

[56] References Cited
UNITED STATES PATENTS
3,503,654  3/1970  Stamm.............. 303/21 EB FOREIGN PATENTS OR APPLICATIONS
1,227,740  4/1971  United Kingdom............. 303/21 EB
329,683    9/1935  Italy....................... 303/85
1,505,423  6/1969  Germany.................... 303/85

Primary Examiner—Robert S. Ward, Jr.

[57] ABSTRACT

An axle assembly, drive or non-driving, steerable or non-steerable, which is a self-contained unit which can be installed on a vehicle and provide anti-wheel lock braking operation.

2 Claims, 6 Drawing Figures

AXLE ASSEMBLY

This is a continuation of application Ser. No. 214,784 filed Jan. 3, 1972, now abandoned.

BACKGROUND OF THE INVENTION

Anti-wheel lock systems in general provide wheel speed sensing devices, a brake pressure modulating valve and a data processing device or computer which provides an output controlling the actuation of the modulating valve in response to sensed changes in wheel speed to inhibit wheel lock with its resultant loss of lateral stability of the vehicle and increased stopping distance. Heretofore these systems have been available as a group of components which the vehicle manufacturer has had to install on each vehicle. These components were, at a minimum, the computer and the control valve and normally also included the wheel speed sensors. Once installed, the computer is then connected electrically to the sensors and to the valve and the vehicle power supply and the control valve is fluid connected to the brake chambers to the fluid reservoir and the operator modulated brake pressure source.

SUMMARY OF THE INVENTION

The axle assembly of the present invention is a unitary assembly in which the control valve and data processing unit or computer are mounted on the axle (preferably being a unitary sub-assembly as disclosed herein) in which the axle outer ends are provided with wheel speed sensors electrically connected to the computer and in which the control valve outlets are connected to the brake actuators. As a result, the axle assembly of the present invention can be used to easily retrofit existing vehicles which don't have anti-wheel lock systems, as replacement assemblies and by original equipment manufacturers, the axle assembly of the present invention merely requiring mechanical connection to the vehicle suspension in the usual manner, fluid connection to the fluid reservoir and the treadle valve outlets in the usual manner, and the single electrical connection to the stop light circuit as a source of electrical power.

While mounting the computer and control valve subassembly on the axle subjects it to greater vibration than if it is mounted on the vehicle chassis where it is protected from vibration by the vehicle suspension, mounting on the axle avoids continual flexing of the electrical connections between the computer and the wheel speed sensors as the vehicle chassis moves relative to the axle and, by use of integrated circuits in the computer as described herein, a reliable antiwheel lock system equipped axle assembly is provided.

Additional advantages and objects will become apparent as the description proceeds.

THE DRAWINGS

Figure 1:
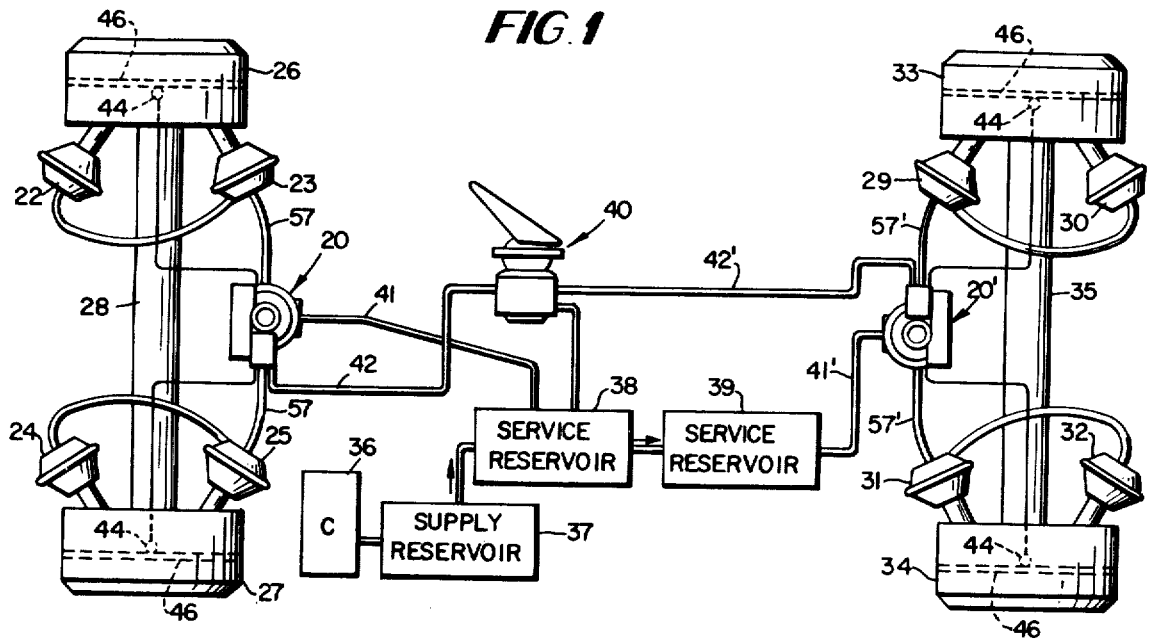
FIG. 1 is a diagrammatic illustration of a typical installation of the control valve of the present invention.

Referring now more particularly to FIG. 1, in the present invention a single control valve is preferably utilized to control the brakes on all wheels mounted on one axle. In the illustrated embodiment, one of the control valve assemblies, indicated generally at 20, controls the operation of the paired actuators 22–23 and 24–25 associated with brake mechanisms 26 and 27 of the wheels on the front axle 28. An identical control valve assembly 20' controls the paired actuators 29–30 and 31–32 associated with the brake mechanisms 33 and 34 on the rear vehicle axle 35. Valve assemblies 20 and 20' are mounted on the axles 28 and 35 by brackets (not shown).

The remainder of the brake system, which is essentially conventional, includes the usual compressor 36 which delivers air under pressure to a supply reservoir 37 and thence to series connected service reservoirs 38 and 39, the former being connected to supply air under service pressure, for example, 100 psi, through line 41 to the control valve 20 associated with the front axle and the latter being connected to supply service air through line 41' to the control valve 20' associated with the rear axle.

The service reservoir 38 is also connected to supply air under pressure to the usual treadle valve 40. When the operator depresses the treadle valve 40, air under the selected pressure is delivered to the control chambers of the control valves 20 and 20' through lines 42 and 42', respectively, as explained in detail below. When the treadle valve is released it vents the pressure in the control chamber.

The electrical control system, which controls the action of the valves 20 and 20', is preferably of the form disclosed in U.S. Pat. No. 3,790,227, issued Feb. 5, 1974. Briefly, the system includes sensors 44 mounted on the axles 28 and 35 adjacent notched discs 46 rotatable with each of the wheels, the sensors 44 generating signals indicative of the angular velocity of the wheels. These signals from the sensors 44 for each axle are supplied to a computer unit carried by the housing of the valves 20 and 20' for that axle. The velocity signals are processed and under certain conditions actuate the valves to modify the brake pressure applied by the operator through the treadle valve 40 in a manner explained in greater detail below.

Figure 2:
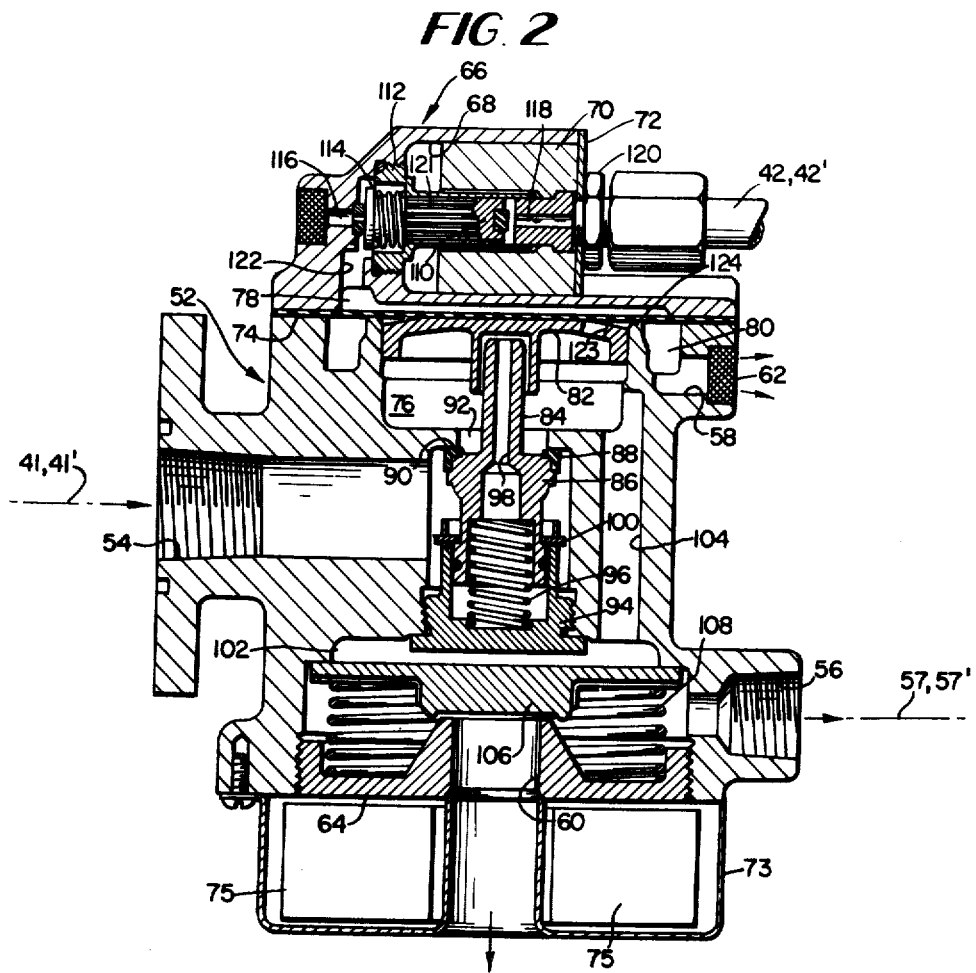
FIG. 2 is a central vertical section illustrating details of construction of one embodiment of the valve of the present invention.

Referring now more particularly to FIG. 2, the valve assembly 20 includes a main generally cylindrical body member 52 having an inlet opening 54 to which air is supplied from the reservoirs 38 or 39 through line 41 or 41' and having one or more outlet openings 56 (one shown) for supplying air to the brake actuators through the lines 57 or 57'. The housing also has a pair of vent openings 58 and 60, the former covered by a filter 62 and the latter being formed in a fitting 64 threaded into the base of the main housing 52.

Secured to the upper end of the main housing 52 by a plurality of bolts (not shown) is an upper housing 66 having a laterally extending cavity 68 which houses a solenoid coil 70 and is closed by an end cover plate 72. A housing 73 detachably secured to the lower end of main housing 52 encloses and supports a computer 75 which processes the signals from the sensors 44 and controls the solenoid 70 as more fully explained in the aforesaid Pat. No. 3,790,227.

Clamped between the main housing 52 and the upper housing 66 is a flexible diaphragm 74 which separates the main flow chamber 76 in the housing 52 from a control chamber 78 in the upper housing 66. The diaphragm 74 also acts as a valve member selectively connecting and disconnecting the flow chamber 76 and an annular chamber 80 communicating with the vent passage 58.

The lower surface of diaphragm 74 is supported on the upper surface of a piston 82 mounted for limited vertical reciprocation in the flow chamber 76. The piston 82 is slidably mounted on the upper end of a stem 84, the lower portion of which carries a valve member 86 having an annular sealing member 88 adapted to engage an annular seat 90 to selectively open and close a passage 92 connecting the inlet 54 with the flow chamber 76.

The lower portion of the valve member 86 is slidably received in a fitting 96 threaded into the valve body 52. A spring 96 compressed between the fitting 94 and the valve 86 urges the latter toward closed position. To permit free movement of the valve 86 in the fitting 94, the internal space between the parts is vented through a stem passage 98. To facilitate installation and removal of the fitting and valve body 86 as a unit the parts are preferably held in assembled relation by a lock ring 100.

The flow chamber 76 is connected to a quick release valve chamber 102 through a passage 104. A quick release valve assembly comprises a valve plate 106 urged by spring 108 to the position shown to open the vent passsage 60, thus venting the brake actuators. When the brakes are applied, the pressure developed in chambers 76 and 102 moves the valve plate 106 downwardly from the position shown to close the vent opening 60 and permit free communication between the flow chamber 76 and the brake actuators.

Figure 3:
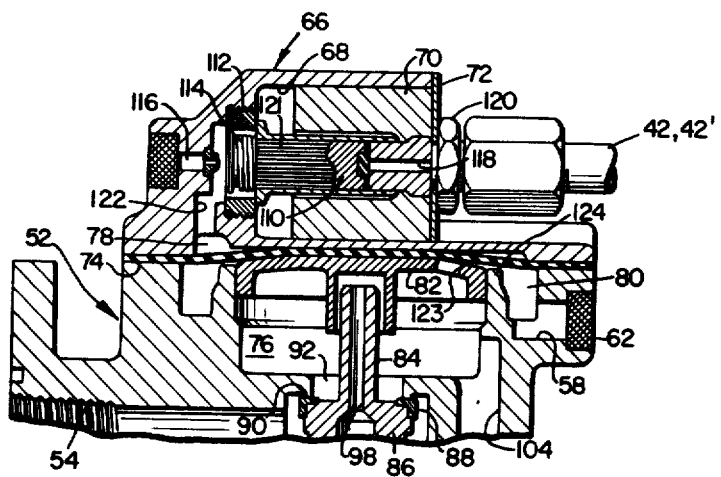
FIG. 3 is a fragmentary section showing components of the valve of FIG. 2 in a different operating position.

The pressure in control chamber 78 is regulated by a shuttle valve or plunger 110 slidably received in a fitting 112, an extension of which passes through the central aperture of the solenoid coil 70. The shuttle valve 110 is normally biased to the left by spring 114 to close a vent port 116 as shown in FIG. 2. When the shuttle valve is in the position air from the treadle valve 40 passes through a central aperture 118 in fitting 120 and along flutes 121 in the valves plunger 110 into passage 122, then into the control chamber 78. When the solenoid 70 is energized the valve plunger 110 is magnetically attracted and thus moves to its opposite limit position, closing the end of passage 118 and connecting the control chamber 78 to the atmosphere through the passage 122 and the vent port 116 as shown in FIG. 3.

The valve is shown in FIG. 2 in its brake OFF position. Air under full service pressure, for example, 100 psi, is supplied to the upstream side of the valve 86, which maintains the port or passage 92 closed because of the pressure differential across the valve augmented by the action of the spring 96. Accordingly, all other portions of the valve are under essentially atmospheric pressure and the brakes are fully released. When the operator actuates the treadle valve 40, air under pressure determined by the operator selected position of the treadle valve is supplied through line 42 or 42' to the control chamber 78. The establishment of the selected pressure in the control chamber 78 depresses diaphragm 74 and piston 82 to open valve 86, permitting air to flow from the inlet port 54 through the port 92 and the passage 104 to move the valve plate 106 downwardly to its seated position permitting the passage of air through the port 56 to the brake actuators. At this time the pressure differential across the diaphragm also maintains the annular exhaust chamber 80 isolated from the flow chamber 76.

As soon as the brakes are seated the pressure in the brake line and the flow chamber 76 rapidly increases until the pressure differential across the diaphragm 74 is eliminated thus restoring the piston 82 and the diaphragm to their original neutral or balanced positions, permitting valve 86 to close, thus establishing the pressure at the brake actuators in accordance with that selected by the operator. When the operator releases the treadle valve 40 the pressure in the supply lines 42, 42' and the pressure in control chamber 78 is reduced to atmospheric. The pressure in flow chamber 76 is supplied to the underside of the diaphragm 74 through one or more vent openings 123 which lifts the diaphragm off the annular seat 124 to connect the control chamber and the space above the valve plate 106 to atmosphere through the vent port 58 as shown in FIG. 3. The valve plate 106 is immediately lifted from its seat by spring 108, venting the brake actuators.

The operation of the valve thus far described assumes that the operator did not supply sufficient brake pressure to cause the wheels to exceed acceptable slip. When excessive slip occurs, the control system (including sensors 44 and computer 75) with which the valve is associated generates two types of signals. The first signal calls for complete brake release to permit the wheels to regain synchronous speed. The control system also generates signals calling for partial brake application pressure after the wheels begin to accelerate. The brake OFF signal energizes the solenoid 70 and maintains the solenoid energized so long as the signal persists. The partial brake pressure signal, on the other hand, rapidly cycles the solenoid on and off.

When the brakes are applied initially the valve will function in the manner thus far described until the brake OFF signal is generated. When this occurs, the energization of the solenoid 70 will shift the plunger 110 to the right, (FIG. 3) closing the inner end of port 118 and opening the vent port 116. This reduces the pressure in control chamber 78 essentially to atmospheric pressure and the consequent action of the valve is the same as if the treadle valve had been released, producing essentially immediate release of the brakes.

If the brake OFF signal is discontinued, the solenoid 70 is deenergized, permitting the plunger 110 to move to the left as viewed in FIG. 2 under the influence of fluid pressure differential and force of the spring 114, closing the vent port 116, opening the inlet port 118 and permitting the development in the control chamber 78 of the pressure signalled by the vehicle operator, thus again placing the brakes under full operator control.

Usually the control system described in the aforementioned U.S. Pat. No. 3,790,227 is effective, upon the detection of an actual or incipient skid condition, to produce a signal calling for brake release followed by a signal calling for partial brake application at a preselected level or a series of preselected levels. The signal is such as to control the duty cycle of the solenoid 70. More specifically, the signal controls the ratio of solenoid ON time to solenoid OFF time in a series of relatively short discrete time intervals. In a typical case the basic cycle time is 40 msec. To establish the desired level of brake pressure the control system energizes the solenoid 70 during a predetermined fraction of each 40 msec period. As the ratio of ON time to OFF time in each cycle period is increased the brake pressure is reduced.

The rapid cycling of the solenoid places the plunger 110 in what may be called a "dithering" mode, in which the plunger rapidly moves between the limit positions shown in FIGS. 2 and 3 in which the control chamber 78 is connected to pressure and to exhaust, respectively.

Figure 6:
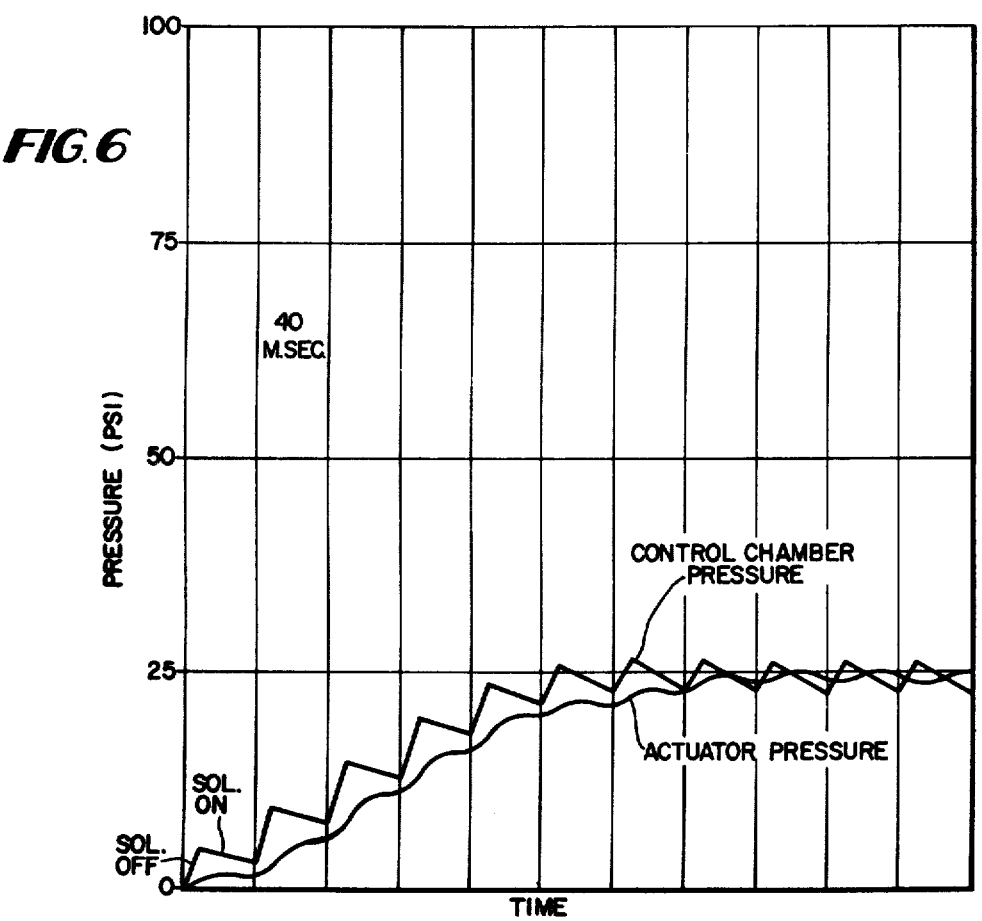
FIG. 6 is a chart illustrating time — pressure curves under typical conditions.

The performance of the control valve under these conditions is illustrated by the graph FIG. 6. In this example it is assumed that a brake OFF signal has been generated reducing the pressure in control chamber 78 and the pressure in the brake actuators essentially to atmospheric, that the service pressure supplied to the inlet port 118 through the lines 42 or 42' is 100 psi and that it is desired to establish a duty cycle for the solenoid 70 such that the ratio of On time to OFF time is 3:1, that is, OFF time is twenty-five percent of the total cycle time.

In the first 40 msec interval the pressure in control chamber 78 will rise relatively rapidly because of the high pressure differential between the pressure existing at inlet opening 118 and the pressure then existing in control chamber 78. During the solenoid ON time the control chamber 78 is vented but the pressure decay rate is relatively small because of the relatively low pressure differential between the control chamber and the atmosphere. In the succeeding cycles the rate of pressure increase during each solenoid OFF period will decrease and the rate of pressure decay during each solenoid ON period will decrease. As the pressure differential between the inlet opening 118 and the control chamber decreases and the pressure differential between the pressure in the control chamber 78 and atmosphere increases, eventually the pressure in control chamber will reach equilibrium value at approximately 25 psi. The pressure in flow chamber 76 and the pressure to brake actuators will follow the pressure in control chamber 78 as explained above.

It will be apparent that by increasing the ratio of ON time to OFF time the system will reach equilibrium at a lower pressure and conversely by decreasing the ratio of ON time to OFF time the system will reach equilibrium at a higher pressure.

Figure 5:
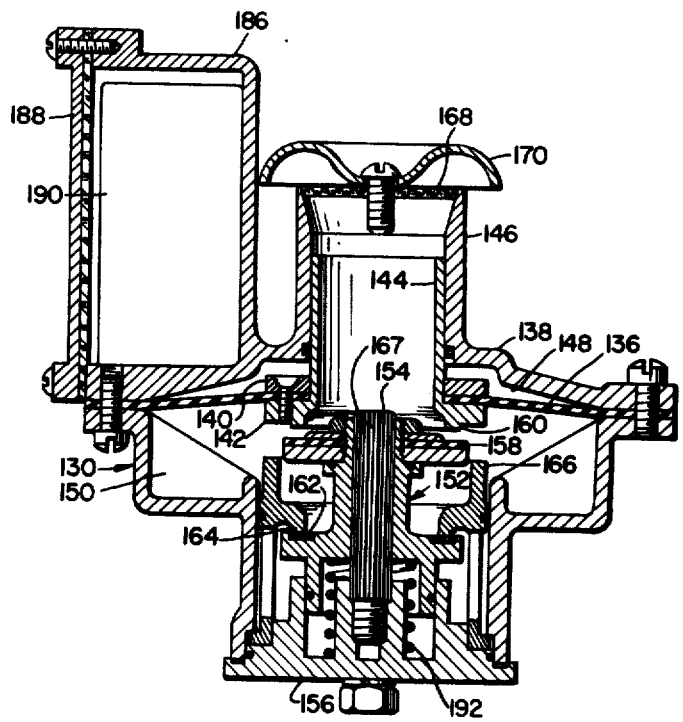
FIG. 5 is a vertical section rotated 90° from the section of FIG. 4 and showing components of the valve in a different operating position.
Figure 4:
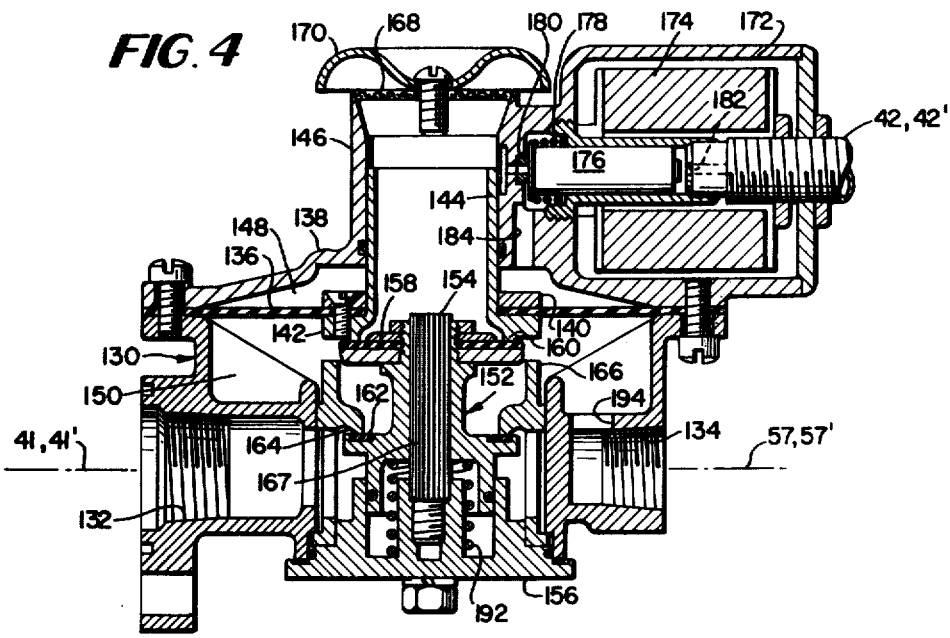
FIG. 4 is a vertical section showing details of another embodiment of the valve of the present invention.

FIGS. 4 and 5, to which detailed reference will now be made, illustrate another embodiment of the valve in accordance with the present invention, the action of which is essentially the same as the embodiment described above.

The main valve body 130 has an inlet opening 132 for connection to the service reservoirs 38 or 39 through line 41 or 41' and an outlet opening 134 connected to the brake actuators through lines 57 or 57'. The periphery of a diaphragm 136 is clamped between the upper surface of the body 130 and a top cover 138. The inner periphery of the diaphragm is clamped between a retainer ring 140 and an annular flange 142 on a sleeve 144 received for vertical reciprocation in a cylindrical boss 146 formed integrally with the top cover 138. The diaphragm 136 divides the valve into a control chamber 148 and a flow chamber 150.

A double valve assembly 152 is mounted for vertical reciprocation on a fixed stem 154 carried by a bottom cover plate 156 suitably secured to the valve body 130. The valve has an upper seal 158 adapted to engage an annular seat 160 formed on the sleeve 144 and a lower seal 162 adapted to engage an annular seat 164 formed on a sleeve 166, the lower end of which is clamped against the body 130 by the bottom cover plate 156.

The stem 154 has a series of longitudinally extending flutes or serrations 167 to connect the space below the valve assembly 152 with the interior of the sleeve 144 and the boss 146, the upper end of which is vented to the atmosphere through a filter 168 and a protective cover plate 170.

The cover plate 138 is provided with a laterally projecting housing 172 containing a solenoid 174 and a plunger 176 which is biased by spring 178 to the position shown to block a vent port 180 leading to the interior of the boss 146 and to permit the flow of air under pressure from the treadle valve through inlet port 182 and passage 184 into the control chamber 148.

When the solenoid 174 is energized the plunger 176 moves to its opposite limit position to block the inlet port 182 and connect the control chamber to atmosphere through the port 180 as in the previously described embodiment.

As shown in FIG. 5, the cover 138 is provided with a second housing 186 circumferentially spaced from the housing 172. The housing 186 which is closed by a removable cover plate 188 houses the computer 190 which receives the signals from the sensors 44 and controls the solenoid 174.

The computer 190 is powered by an electrical connection (not shown) from the stop light circuit of the vehicle. Accordingly, whenever the vehicle brake pedal or treadle is depressed to apply the vehicle brakes, the application of voltage to the stop light will also apply voltage and power to the computer 190. Being a completely integrated and transistorized circuit, it is instantaneously operative.

In addition, the computer 190 is connected to each of the wheel speed sensors 44 and to ground. The wheel speed sensors 44 provide the computer with a fluctuating signal, the instantaneous frequency of which is directly proportional to the instantaneous velocity of the wheel at that time.

In summary, therefore, there are but four electrical connections or leads from computer 190 which are external of the complete valve assembly 20. In addition, there is an internal output connection from computer 190 to the solenoid coil 70.

The opposite sides of the solenoid coil 70 and the sensors 44 are of course electrically grounded to complete the circuits.

The heart of the computer 190 is a MOS chip which contains all of the integrated logic circuitry of the digital computer. In addition, computer 190 contains an electrical power supply, a solenoid driver circuit and auxiliary protective circuits to prevent potential damage to the components as the result of varying polarity of the power supply from vehicle to vehicle as is possible when a trailer is connected to different tractors, and to check the proper functioning of the electrical circuitry.

Accordingly, the present invention provides a completely self-contained anti-wheel lock axle assembly requiring electrically only an external power source and providing fluid pressure control to the brakes which is effective to inhibit wheel lock with resultant loss of lateral stability of the vehicle and increased stopping distance during braking which would otherwise result as the wheels approach incipient skid condition.

The valve is illustrated in FIG. 4 in the brake OFF position. The flow of air under pressure into the valve is blocked by the engagement of seal 162 with the seat 164. The flow chamber 150 and the control chamber 148 are under atmospheric pressure. During normal brake application air under pressure is transmitted through the treadle valve 40 directly to the control chamber through lines 42 or 42' to inlet passage 182 and passage 184. The pressure differential across the diaphragm 136 will depress the diaphragm tightly engaging seal 158 and seat 160 moving the valve assembly 152 downwardly against the action of spring 192 to permit air under pressure to enter flow chamber 150 and pass through the opening 194 and through the outlet port 134 to the brake actuators. As soon as the pressure in the flow chamber 150 euals the pressure in the control chamber 148 the components of the valve will resume the neutral or balanced position shown in FIG. 4. When the operator discontinues the application of brakes at the treadle valve 40, the pressure in the control chamber 148 is rapidly reduced to atmospheric and the resulting upwardly acting pressure differential across the diaphragm 136 will lift the diaphragm and move the valve seat 160 away from seal 158 as shown in FIG. 5, thus connecting chamber 150, port 134 and the brake actuators to exhaust through the passage in the boss 146.

The action of the solenoid 174 in releasing the brakes when energized or in establishing a partial brake pressure when cyclically energized and deenergized is the same as in the previously described embodiment.

For trailer hollow axles, the interiors of axles 28 and 35 can provide sealed chambers which form the service reservoirs 38 and 39 so that the only required fluid connection to the axle assemblies are from supply reservoir 37, the treadle valve 40 and the only required electrical connection is from the valve assembly 20 to a power source such as the stop light circuit.

What is claimed is:

1. An anti-wheel lock vehicle axle assembly comprising an axle; a wheel hub rotatably mounted on each end of said axle and adapted to have a ground engaging wheel mounted thereon; a fluid powered brake mechanism mounted to said axle at each end thereof; each said brake mechanism being adjacent one of said wheel hubs and operative when actuated to restrain rotation of said wheel hub and any wheel mounted thereon; a sensor mounted on said axle adjacent each said wheel hub and adapted to generate electrical signals indicative of the angular velocity of said wheel hub and any wheel mounted thereon, a brake control valve assembly mounted on said axle and including a valve for selectively modulating the flow of brake actuating fluid from a source to each of said fluid powered only, a mechanisms only, a solenoid in said valve assembly for controlling the operation of said valve, and a computer in said valve assembly electrically connected to said sensors for processing the electrical signals from said sensors and connected to said solenoid, said computer having means for delivering an output signal to successively energize and deenergize said solenoid during each of a series of discrete time intervals to respectively disconnect and connect each of said brake mechanisms to said source of brake actuating fluid upon detection of an actual or incipient skid condition, and said computer also having means for varying the ratio of solenoid ON time to solenoid OFF time during each of said time intervals.

2. The axle assembly defined by claim 1 wherein said axle is a hollow trailer axle providing a sealed fluid chamber in its interior, said chamber having an inlet connectable to a source of super atmospheric pressure and an outlet connected to said valve whereby said chamber forms said source of brake actuating fluid, the only required electrical connection to said axle assembly is a power connection to said computer and the only required fluid connections to said axle assembly are connections to said source of super atmospheric pressure and to a vehicle operator controlled valve.

* * * * *